(12) United States Patent
Chen

(10) Patent No.: US 9,389,383 B2
(45) Date of Patent: Jul. 12, 2016

(54) HYBRID OPTICAL FIBER CABLE

(71) Applicant: Verizon Patent and Licensing Inc., Basking Ridge, NJ (US)

(72) Inventor: David Z. Chen, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/967,808

(22) Filed: Aug. 15, 2013

(65) Prior Publication Data
US 2015/0049995 A1 Feb. 19, 2015

(51) Int. Cl.
*G02B 6/44* (2006.01)

(52) U.S. Cl.
CPC .................................. *G02B 6/4416* (2013.01)

(58) Field of Classification Search
CPC ...................................................... G02B 6/4416
USPC ............................................................ 385/101
See application file for complete search history.

(56) References Cited

U.S. PATENT DOCUMENTS

| 5,539,851 | A  | * | 7/1996  | Taylor et al. | 385/101 |
| 6,813,421 | B2 | * | 11/2004 | Lail et al.   | 385/101 |
| 8,620,124 | B1 | * | 12/2013 | Blazer et al. | 385/102 |

* cited by examiner

*Primary Examiner* — Omar R Rojas

(57) ABSTRACT

A hybrid optical fiber cable is disclosed for supplying both signals and power. The hybrid optical fiber cable includes an inner jacket and an outer jacket. Multiple power supply lines and optical fiber signal lines are disposed within the inner jacket. The optical fiber signal lines are used only for transmitting video, data, voice, and/or control signals through the hybrid optical fiber cable. A grounding portion is also provided between the inner jacket and the outer jacket in order to provide a return current path for the hybrid optical fiber cable.

6 Claims, 5 Drawing Sheets

HYBRID OPTICAL FIBER CABLE

BACKGROUND INFORMATION

Information and communication technology are constantly growing and evolving. Along with this growth comes the need to improve and upgrade the infrastructure associated with the transmission of information such as, for example, voice, data, and video. Current infrastructure consists primarily of metal based signal conductors, such as copper wires. Individual wires are typically bundled in a cable and deployed between the service provider's facilities to all necessary locations. In order to keep pace with consumer demands for increased data transmission, however, it is necessary to increase the bandwidth available to carry signals (e.g., voice, data, video, etc.) beyond that available with existing cables utilizing copper wires.

One way of achieving such improvement involves migrating and/or upgrading from metal based signal conductors to faster, higher bandwidth conductors such as optical fiber (also referred to as fiber optics or simply fiber). Although it is possible to increase the capacity of cables containing copper wires, this requires significantly increasing the number wires within the cable. Increasing the number of wires, however, results in a corresponding increase in both size and weight. It also becomes more difficult to handle and deploy the larger cable.

Unlike copper-based wires, however, optical fibers do not carry power (i.e., electricity). They only carry signals corresponding to voice, data, video, etc. The power is necessary however, because it is used by various stations and equipment which transmit and/or process the signals carried by the optical fibers. Stations and equipment which process signals from cables consisting of optical fibers would therefore require a separate power source such as, for example, the local power grid. When deploying in certain rural areas, a separate power source may not be available to use with the cable. During a power failure, however, service to existing customers could be limited and/or interrupted, thus resulting in obstacles to reliable service. Further complicating migration to optical fiber cables is the need to properly ground the cable itself in order to provide a return current path and to minimize safety risks.

Based on the foregoing, there is a need for upgrading legacy metal based signal cables to optical fiber, and for supplying power independent of the local electric grid.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

Figure 1:
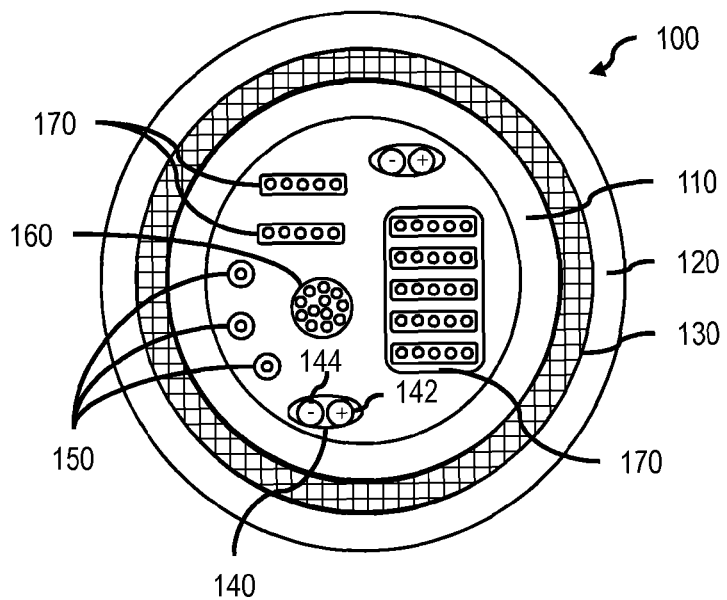
FIG. 1 is a cross-sectional view of a hybrid cable, according to one embodiment.

A hybrid optical fiber cable is described. In the following description, for the purposes of explanation, numerous specific details are set forth in order to provide a thorough understanding of the present invention. It is apparent, however, to one skilled in the art that various embodiments may be practiced without these specific details or with an equivalent arrangement. In other instances, well-known structures and devices are shown in block diagram form in order to avoid unnecessarily obscuring the present invention.

According to an embodiment, there is a hybrid cable comprising an inner jacket having a hollow interior; at least one power supply line disposed within the inner jacket, each power supply line including a pair of conductors for conducting power through the hybrid cable; one or more optical fiber signal lines disposed within the inner jacket for transmitting data, voice, and/or control signals through the hybrid cable; an outer jacket surrounding the inner jacket, and a grounding portion disposed between the inner jacket and the outer jacket. The grounding portion may comprise a sheet of mesh wire surrounding the inner jacket. The grounding portion may comprise at least one wire wrapped around the outer jacket. The grounding portion may comprise at least one wire embedded within the outer jacket. The hybrid cable may further comprise a hard termination portion comprising a cable receiving sleeve sized to receive the inner jacket therein, and a crimping sleeve sized to receive the hybrid cable and cable receiving sleeve therein, wherein the cable receiving sleeve comprises a tubular inner portion sized to receive the inner jacket therein, and a conical outer portion and wherein the hard termination portion is formed by compressing the crimping sleeve over the cable receiving sleeve. The hybrid cable may further comprise a soft termination portion wherein the grounding portion includes a plurality of wires disposed between the inner jacket and the outer jacket, and wherein the soft termination portion is formed by pulling back the plurality of wires to tear through and remove at least a portion of the outer jacket, and wrapping the plurality of wires around the inner jacket. The hybrid cable may further comprise a mounting unit having at least one grounding connector for contacting the grounding portion, the mounting unit being configured to receive the hybrid cable therein and to contact an external grounding source. In the hybrid cable, each of the one or more optical fiber signal lines may comprise a single fiber wire. In the hybrid cable, each of the one or more optical fiber signal lines may comprise a bundle of single fiber wires. In the hybrid cable, each of the one or more optical fiber signal lines may comprise a single ribbon containing a plurality of single fiber wires. In the hybrid cable, each of the one or more optical fiber signal lines may comprise a bundle of single ribbons, each single ribbon containing a plurality of single fiber wires. In the hybrid cable, each of the one or more optical fiber signal lines may be selected from the group consisting of a single fiber wire, a bundle of single fiber wires, a single ribbon of fiber wires, a bundled ribbon of fiber wires.

FIG. 1 is a cross-sectional view of a hybrid cable 100 in accordance with at least one embodiment. The hybrid cable 100 includes an inner jacket 110 which has a hollow interior suited for receiving various transmission lines, as will be discussed in greater detail below. The hybrid cable 100 also includes an outer jacket 120 which surrounds the inner jacket 110. According to the embodiment illustrated in FIG. 1, a grounding portion 130 is disposed between the inner jacket 110 and the outer jacket 120. The grounding portion 130 is used to provide a contact surface for grounding the entire hybrid cable 100 by providing a return current path. Furthermore, the grounding portion 130 allows the hybrid cable 100 to be grounded prior to handling of any signal or power transmission lines disposed within the inner jacket. The inner jacket 110 and the outer jacket 120 can be constructed from various materials, such as those used in conventional cable constructions.

The hybrid cable 100 is configured to receive a variety of signal lines, as well as power supply lines 140, within the inner jacket 110. For example, FIG. 1 illustrates a hybrid cable 100 which contains two power supply lines 140 disposed within the inner jacket 110. Each power supply line 140 includes a pair of conductors, such as a positive conductor 142 and a negative conductor 144. The power supply lines 140 are used as power sources for various components and peripherals that are used as part of the service provider's infrastructure. More particularly, the power supply lines 140 function as an independent power source which facilitates power transmission to various components without relying on available power from the utility responsible for supplying power. As can be appreciated, power grids can be very susceptible to outages resulting, for example, from natural disasters. These outages can often be prolonged as a result of existing weather conditions. Thus, use of a grid-independent power source can advantageously allow the hybrid cable 100 to reliably transmit signals regardless of the status of local power utilities.

As illustrated in FIG. 1, the hybrid cable 100 can also contain various types optical fiber signal lines for transmitting (or conducting) video, data, voice, control signals, etc. through the hybrid cable 100. According to various embodiments, the optical fiber signal lines can be provided in various configurations. For example, the optical fiber signal lines can be in the form of a single fiber wire 150 that is used to transmit the signals through the hybrid cable 100. The optical fiber signal lines can also be configured as an optical fiber bundle 160 (i.e., a bundle of single fiber wires). Thus, one optical fiber bundle 160 can include 10, 20, 30, etc. single fiber wires 150 based on the desired bandwidth for signal transmission.

The optical fiber signal lines can also be configured as a single optical fiber ribbon 170 which contains a plurality of single fiber wires 150. Furthermore, the optical fiber signal lines can be configured as a ribbon bundle 180 (i.e., a bundle of optical fiber ribbons 170), wherein each optical fiber ribbon 170 contains a plurality of single fiber wires 150. According to one or more embodiments, the hybrid cable 100 can be configured to carry any combination of power supply lines 140 and signal supply lines 150-180. Thus, the hybrid cable 100 can include one or more power supply lines 140, one or more single fiber wires 150, one or more optical fiber bundles 160, one or more optical fiber ribbons 170, and/or one or more ribbon bundles 180. As can be appreciated, any combination of power supply lines 140 and signal supply line configurations can be used depending on the specific requirements and applications.

Figure 2:
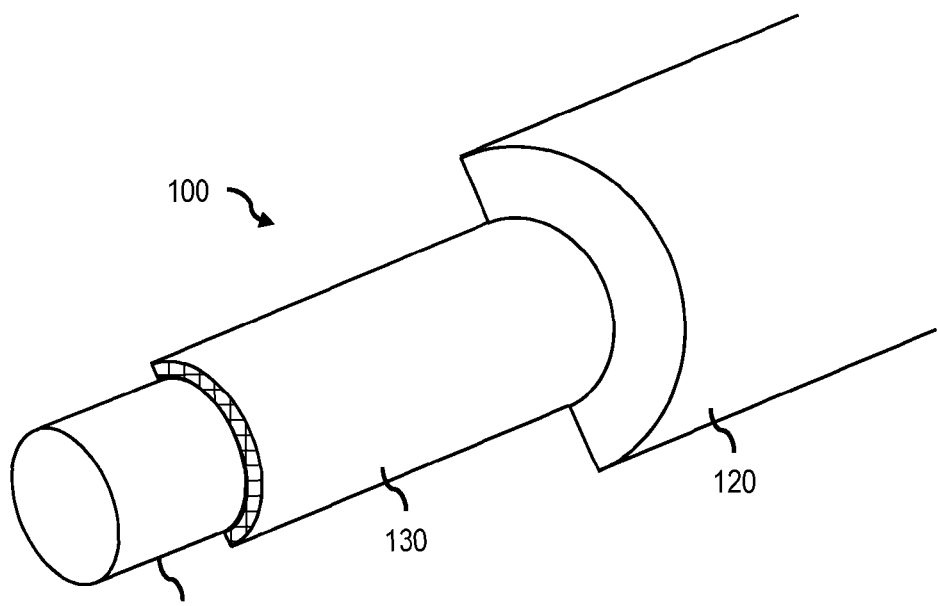
FIG. 2 is a cutaway view of the hybrid cable of FIG. 1, according to one embodiment.

According to at least one embodiment, the grounding portion 130 can be configured as a sheet of mesh wire which surrounds the inner jacket 110. Referring additionally to FIG. 2, it can be seen that the grounding portion 130 surrounds the inner jacket 110, and extends the length of the hybrid cable 100. Furthermore, the outer jacket 120 is configured such that it completely surrounds the grounding portion 130 as well as the inner jacket 110. The grounding portion 130 can be constructed from various types of conductive materials capable of providing the necessary level of conductivity for grounding the hybrid cable 100. Since the grounding portion 130 is not used for signal transmission, the use of highly conductive and/or high quality materials is only an option, and not a necessity. Accordingly, the cost associated with constructing the hybrid cable 100 can be reduced.

Figure 3:
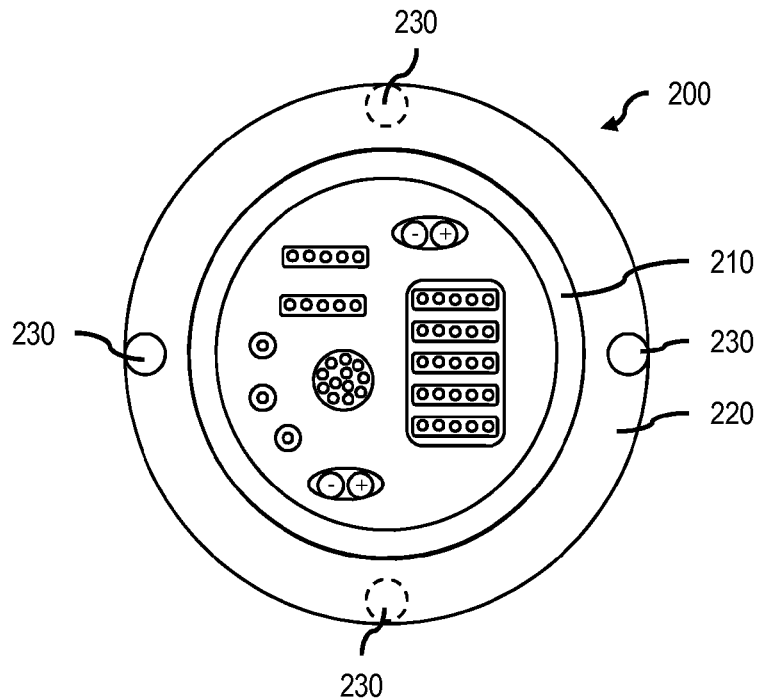
FIG. 3 is a cross-sectional view of a hybrid cable, according to one embodiment.

FIG. 3 illustrates a cross-sectional view of a hybrid cable 200 in accordance with at least one embodiment. The hybrid cable 200 includes an inner jacket 210, as well as an outer jacket 220. The inner jacket 210 is configured to carry various combinations of power supply lines 240 and optical fiber signal lines. As previously discussed, the power supply lines 240 each include a positive conductor 242 and a negative conductor 244, and function to supply power to various components and peripherals used as part of the service provider's infrastructure. The hybrid cable 200 can also contain various types optical fiber signal lines for transmitting video, data, voice, control signals, etc. As illustrated in FIG. 3, the optical fiber signal lines can be configured as a single fiber wire 250, an optical fiber bundle 260, a single optical fiber ribbon 270 containing a plurality of single fiber wires 250, and a ribbon bundle 280. It should be further noted that the hybrid cable 200 can also be configured to carry any combination of power supply lines 240 and signal supply lines 250-280.

According to the embodiment illustrated in FIG. 3, the grounding portion is configured as one or more internal grounding wires 230 that are embedded within the outer jacket 220. For example, the internal grounding wires 230 can be positioned along the diameter of the hybrid cable 200 and at opposite ends thereof. Furthermore, additional internal grounding wires 230 can be provided at various locations along the circumference of the outer jacket 220, as represented by the broken lines. The precise configuration of the internal grounding wires 230 can vary depending on the specific application and/or the manner in which the grounding portion will be connected to an external ground. For example, if a simple clamping unit will be used to connect the grounding portion to an external ground, it may be sufficient to provide only two internal grounding wires 230. Alternatively, if a compression type clamp will be used to connect the grounding portion to an external ground, additional internal grounding wires 230 (broken lines) may be provided within the outer jacket 220 in order to provide additional and/or continuous points of contact. Furthermore, the specific material used to construct the grounding portion can dictate the number of internal grounding wires 230 necessary to provide the requisite grounding capability.

Figure 4:
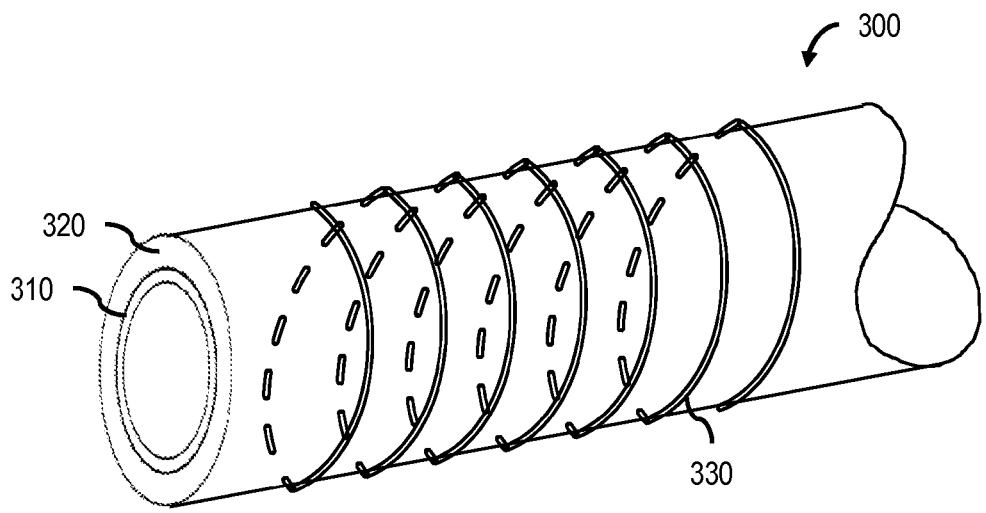
FIG. 4 is perspective view of a hybrid cable, according to one embodiment.

FIG. 4 illustrates a hybrid cable 300 in accordance with at least one embodiment. The hybrid cable 300 illustrated in FIG. 4 also includes an inner jacket 310, and an outer jacket 320. Similar to the previously described embodiments, the inner jacket 310 can house various combinations of power supply lines and signal supply lines (not shown). The grounding portion of the hybrid cable 300, however, is configured as an external grounding wire 330 that is wrapped around the outer jacket 320 of the hybrid cable 300. Alternatively, multiple external grounding wires 330 can be wrapped around the outer jacket 320 in order to function as the grounding portion. Such external grounding wires 330 can be constructed in the same manner as conventional wires, which include a metal core disposed within an insulating jacket, in order to avoid accidental contact with external components and/or hardware.

Figure 5A:
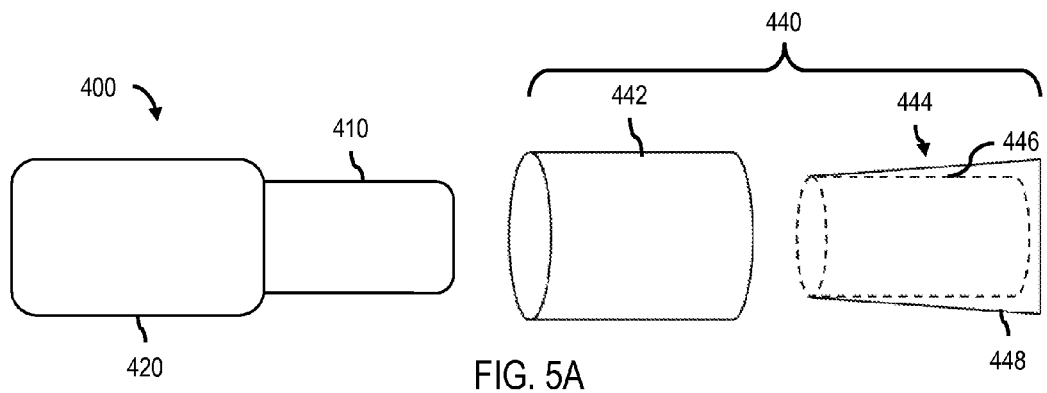
FIGS. 5A-5C are diagrams illustrating formation of a hard termination portion on a hybrid cable, according to one embodiment.
Figure 5B:
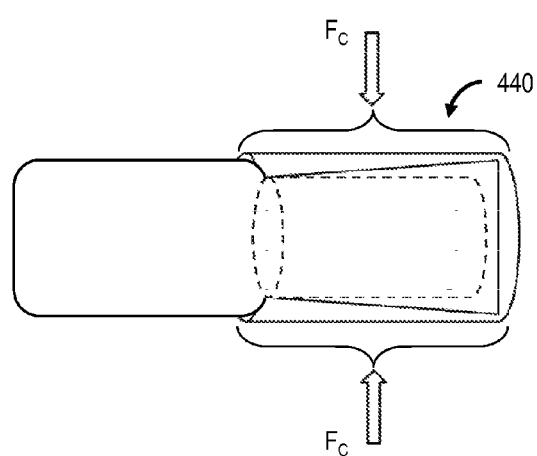
Figure 5C:
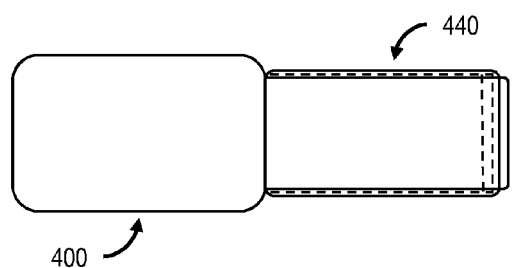

FIGS. 5A-5C illustrate a hybrid cable 400 having a hard termination portion 440, in accordance with one embodiment. The hybrid cable 400 includes an inner jacket 410 and an outer jacket 420. Although not shown in the illustration, various combinations of power supply lines and optical fiber signal lines can be disposed within the inner jacket 410. The hard termination portion 440 includes a crimping sleeve 442 and a cable receiving sleeve 444. The crimping sleeve 442 is constructed and sized such that it can slidably receive the outer jacket 420 through its interior. The cable receiving sleeve 444 includes an inner portion 446 having a tubular shape, and an outer portion 448 having a conical shape. The inner portion 446 and the outer portion 448 are joined together in the proximity of the minor diameter of the outer portion 448. Furthermore, the inner portion 446 is configured and sized such that it can receive the inner jacket 410 through its interior.

As illustrated in FIG. 5B, a portion of the outer jacket 420 is removed from the hybrid cable 400 in order to expose the inner jacket 410. The exposed portion of the inner jacket 410 is then inserted into the cable receiving sleeve 444. The cable receiving sleeve 444, together with the inner jacket 410, are then inserted into the crimping sleeve 442. At this time, a crimping force $F_c$ is applied to the crimping sleeve in order to form the hard termination portion 440. According to one or more embodiments, the crimping sleeve 442 and cable receiving sleeve 444 can be constructed of a conductive material (e.g., copper, copper alloy, etc.) and function as a grounding portion for the hybrid cable 400. According to other embodiments, a grounding portion can be provided between the inner jacket 410 and the outer jacket 420. Upon application of the crimping force $F_c$, the crimping sleeve 442 and the cable receiving sleeve 444 would become in electrical communication with the grounding portion.

Figure 6A:
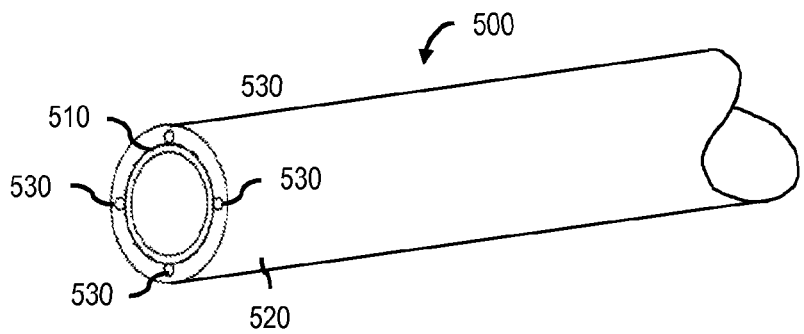
FIGS. 6A-6C are diagrams illustrating formation of a soft termination portion on a hybrid cable, according to one embodiment.
Figure 6B:
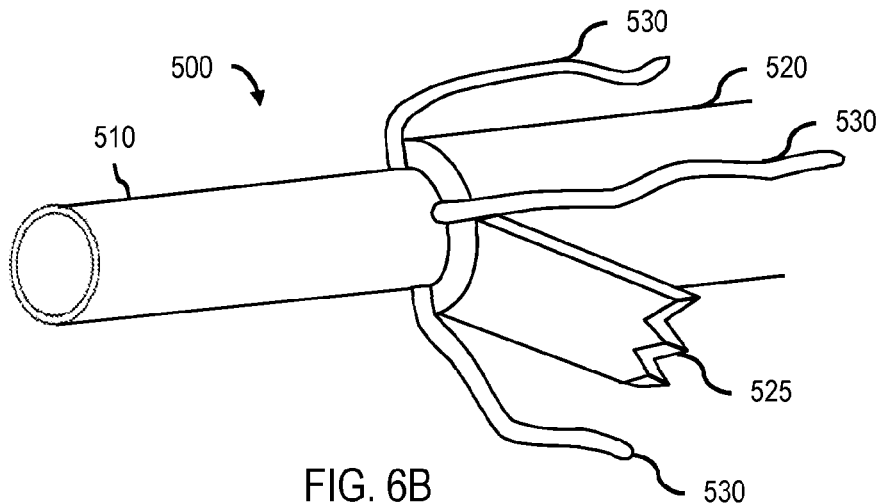
Figure 6C:
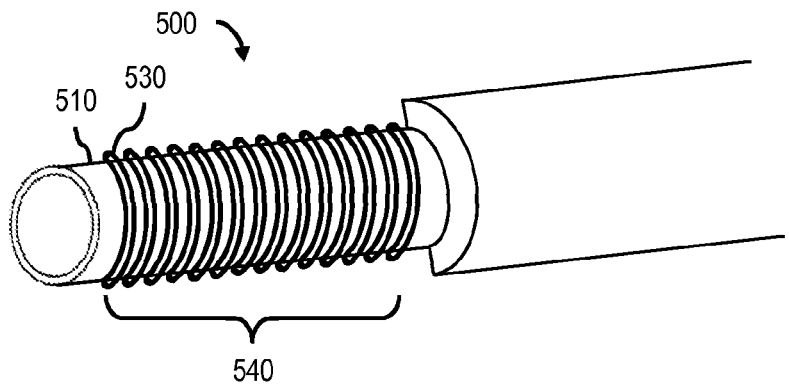

FIGS. 6A-6C illustrate a hybrid cable 500 having a soft termination portion 540, in accordance with at least one embodiment. Similar to some of the previously described embodiments, the hybrid cable 500 includes and inner jacket 510 configured to carry various combinations of power supply lines and optical fiber signal lines (not shown), and an outer jacket 520 which surrounds the inner jacket 510. According to the illustrated embodiment, a plurality of rip wires 530 are provided between the inner jacket 510 and the outer jacket 520. The rip wires 530 are then pulled such that they tear through the outer jacket 520, and expose the inner jacket 510. At this point, the torn portions 525 (only one shown) of the outer jacket 520 can be cut and removed from the hybrid cable 500. Next, the rip wires 530 are wrapped around the inner jacket 510 in order to form the soft termination portion 540. According to at least one embodiment, the rip wires 530 can be in the form of conductive wires capable of functioning as the grounding portion.

Figure 7:
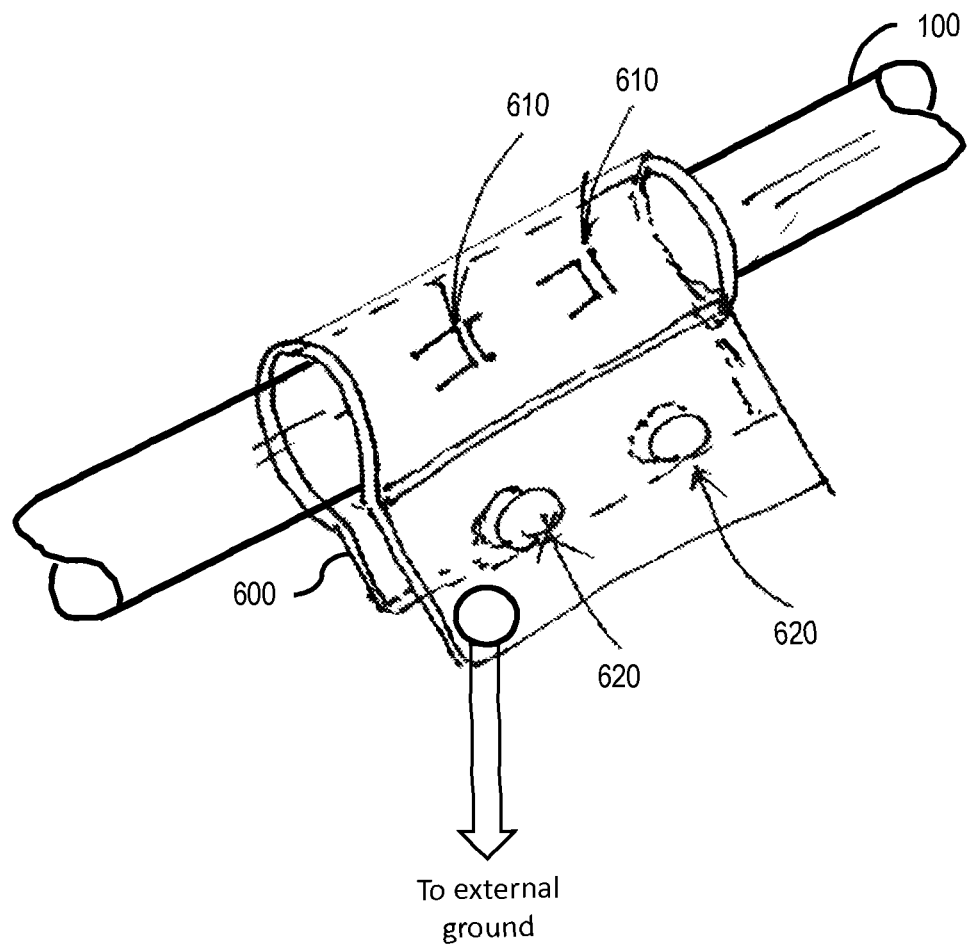
FIG. 7 is a diagram of a mounting unit for a hybrid cable, according to one embodiment.

FIG. 7 is a diagram illustrating a mounting unit 600 for a hybrid cable 100 in accordance with at least one embodiment. During deployment, it will often be necessary to securely mount and/or route the hybrid cable 100. This can be accomplished, for example, using a mounting unit 600 configured to receive the hybrid cable 100 and secure it to various structures (e.g., poles, building components, etc.). According to at least one embodiment, the mounting unit 600 can be provided with one or more grounding connectors 610 designed to pierce the outer jacket of the hybrid cable 100 and contact the grounding portion in order to provide a connection to an external source. For example, the mounting unit 600 can also include one or more screws 620 that are used to exert sufficient pressure for causing the grounding connectors 610 to puncture the outer jacket of the hybrid cable 100 and contact the grounding portion. Additional screws 620 can also be provided for securing the mounting unit 600 to a poll, or other location when deploying the hybrid cable 100.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. A hybrid cable comprising:
   an inner jacket having a hollow interior;
   at least one power supply line disposed within the inner jacket, each power supply line including a pair of conductors for conducting power through the hybrid cable;
   one or more optical fiber signal lines disposed within the inner jacket for transmitting data, voice, and/or control signals through the hybrid cable;
   an outer jacket surrounding the inner jacket;
   a grounding portion disposed between the inner jacket and the outer jacket; and
   a soft termination portion,
      wherein the grounding portion includes a plurality of wires disposed between the inner jacket and the outer jacket, and
      wherein the soft termination portion is formed by pulling back the plurality of wires to tear through and remove at least a portion of the outer jacket, and wrapping the plurality of wires around the inner jacket.

2. A hybrid cable of claim 1, wherein each of the one or more optical fiber signal lines comprises a single fiber wire.

3. A hybrid cable of claim 1, wherein each of the one or more optical fiber signal lines comprises a bundle of single fiber wires.

4. A hybrid cable of claim 1, wherein each of the one or more optical fiber signal lines comprises a single ribbon containing a plurality of single fiber wires.

5. A hybrid cable of claim 1, wherein each of the one or more optical fiber signal lines comprises a bundle of single ribbons, each single ribbon containing a plurality of single fiber wires.

6. A hybrid cable of claim 1, wherein the one or more optical fiber signal lines are selected from the group consisting of a single fiber wire, a bundle of single fiber wires, a single ribbon of fiber wires, a bundled ribbon of fiber wires.

* * * * *